Aug. 18, 1953  H. A. KENNEDY  2,649,495
BATTERY CAP
Filed May 12, 1951

INVENTOR.
Henry A. Kennedy
BY
Bean, Brooks, Buckley & Bean
ATTORNEYS.

Patented Aug. 18, 1953

2,649,495

UNITED STATES PATENT OFFICE 2,649,495

BATTERY CAP

Henry A. Kennedy, Philadelphia, Pa., assignor to Gould-National Batteries, Inc., St. Paul, Minn.

Application May 12, 1951, Serial No. 226,084

8 Claims. (Cl. 136—178)

This invention relates to storage batteries, and more specifically to an improved form of filling opening cap for storage battery containers and the like. The invention is especially adapted to storage batteries in mobile use, in motor vehicles, railway equipment, submarines, and the like; and this application is a continuation-in-part of my copending application Serial No. 60,578 filed November 17, 1948.

An object of the present invention is to provide an improved battery vent cap of the character aforesaid and which embodies an improved weighted self-latching lid construction.

Another object of the invention is to provide in a device of the character aforesaid an improved cap mounting or adapter construction.

Other objects and advantages of the invention will appear from the specification hereinafter.

Figure 1:
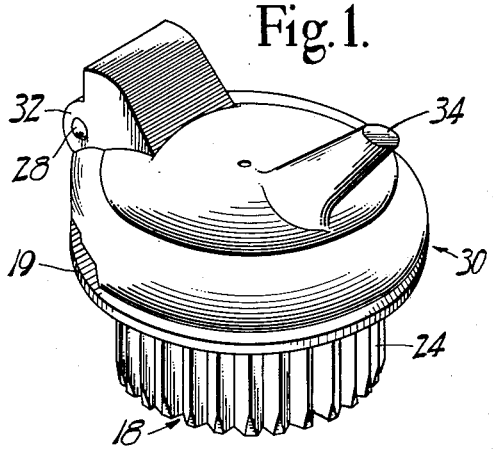
Fig. 1 is a top perspective view of a cap of the invention shown with the lid in closed condition.
Figure 2:
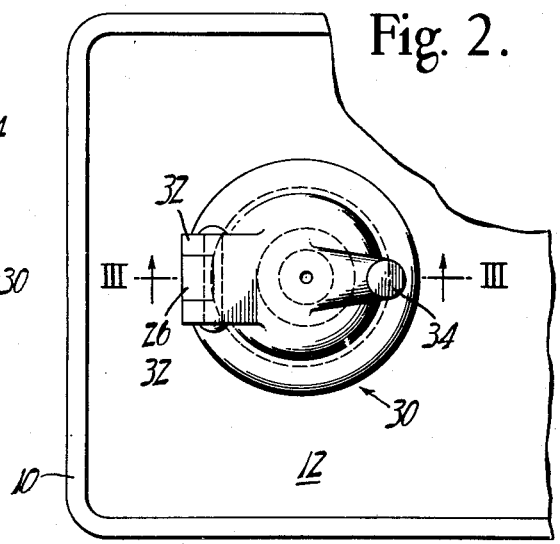
Fig. 2 is a fragmentary top elevation of a storage battery cell, illustrating a vent cap device of the invention in closed position thereon.
Figure 3:
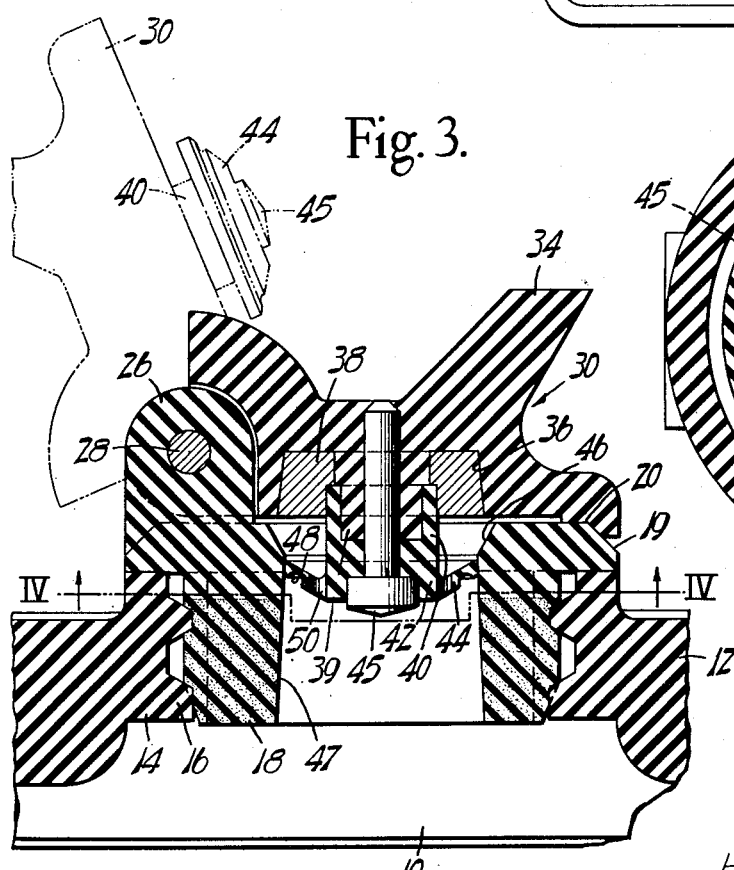
Fig. 3 is a fragmentary section, on an enlarged scale, taken along line III—III of Fig. 2, showing in solid lines the cap device in closed position and in broken lines the cap in open or servicing position.

In the drawing the invention is illustrated in connection with a storage battery cell designated generally 10; the cell 10 having a top cover plate portion 12 which is formed with a conventional style opening comprising a tubular wall portion 14 (Fig. 3) which is internally threaded as indicated at 16 in order to accommodate the conventional screw-threading type cap such as is normally used for battery opening cover purposes. The cap device of the present invention includes an adapter comprising a skirt portion 18 and an integral annular top flange 19 which seats upon the top surface of the vent well 14. The top flange is formed with an annular seat portion 20 which is adapted to receive the lid in flat seated relation thereon as will be explained hereinafter. The adapter skirt 18 is externally serrated as indicated at 24 and whereas the upper shoulder portion 19 thereof is formed of relatively hard rubber or the like, the lower serrated skirt portion 18 thereof is formed of semi-hard rubber or the like. Thus, the adapter skirt 18 is adapted to be pressed down and turned with a screw-threading type motion, whereupon the softer serrated part of the adapter will thread its way into the threaded part 16 of the battery cell cover until the adapter becomes firmly seated therein as shown in the drawing (Fig. 3).

A particular feature of this construction is that the semi-hard serrated surface formation of the adapter skirt permits firm mechanical fitting of the adapter into the vent well of the cell cover in spite of wide variances in the inside diameters of the wells such as are invariably met in practice. It is because of such variances in the inside diameters of battery vent wells that prior efforts to design such adapter skirts with solid cylindrical press fit surfaces have provided only unsatisfactory results. In the case of the present invention the serrations of the adapter skirt portion plastically deform and accommodate themselves to the threads of the vent well and snugly fit thereinto and firmly mount the adapter on the cell cover in spite of dimensional irregularities and/or variances therein.

The annular shoulder 19 of the adapter is formed with a hinge bearing ear 26 integrally therewith which carries the pintle 28 of the lid hinge structure. The lid portion is designated generally at 30 to comprise a molded circular body adapted to cover the annular shoulder 19. The lid 30 is formed with ear portions 32—32 which mount the pintle 28, thereby pivotally connecting the lid 30 to the adapter 18. Preferably, the lid 30 is provided with a projecting handle 34 to facilitate opening of the lid such as by placing the end of a battery filling pipe or other suitable tool under the outer end of the handle 34 and then prying upwardly thereon so as to swing the lid upwardly and rearwardly as to the broken line position thereof shown in Fig. 3.

The lid member 30 is formed at its inner central surface with an inwardly extending annular recess 36 into which is inserted an annular weight 38 formed of lead or the like. An integral central boss portion 39 extends downwardly from the lid and mounts thereon the skirt portion 40 of a valve member 42 formed of soft rubber or the like which includes a conically shaped flexible valve disc portion 44 which is also formed of some suitable pliable acid resistant material, such as for example a soft rubber or synthetic resin fabrication, or the like. A headed pin 45 formed of plastic material or the like is force fitted through the valve and boss structure 39 and is bonded therein by cement or the like to hold the valve and weight parts in assembled position.

The valve piece 44 is dimensioned to bridge the inner bore of the adapter flange 19 so that when the lid is in its closed position (as illustrated by the solid line showing in Fig. 3) the battery electrolyte will be prevented by the valve piece 44 from spraying or splashing out of the cell, such as during battery charging or when the vehicle carrying the battery is jolted.

Figure 4:
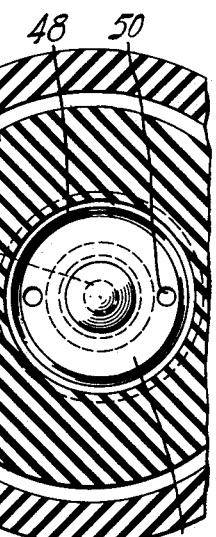
Fig. 4 is a section taken along line IV—IV of Fig. 3.

To facilitate operation of the valve 44, the upper end portion of the chapter bore is bevelled as indicated at 46 (Fig. 3), whereby whenever the lid moves toward its closed position the valve 44 easily wipes downwardly into the funnelled bore of the adapter and then assumes the electrolyte sealing position as illustrated in the drawing. It is a particular feature of this invention that the adapter skirt 18 is interiorly taper-bored as indicated at 47 so that the juncture of the main bore 47 and the bevel bore 46 provides a position of least diameter and in effect provides an inwardly extending slope against which the valve disc 44 moves under increasing compression whenever the lid tends to open. This action provides an automatic "latching" of the lid against accidental opening and/or chattering of the lid such as would permit slopping of the battery acid and/or entrance of debris into the cell during external cleansing operations or the like. Also, if when the lid is first closed, the valve disc does not pull completely into bore 47, service jogging will subsequently operate to cause the valve disc to "settle" or creep downwardly into latching position. As shown at 48 (Figs. 3-4) the valve disc 44 is annularly grooved adjacent its periphery to facilitate flexing of the edge of the valve disc whenever the lid 30 is intentionally opened. Thus, although the valve disc operates normally to "latch" the lid in closed position, upon application of a lifting pressure against the lid handle, the valve disc will "roll" at its edge to ease the lid opening operation.

To permit the gases which are generated during operation of the battery to escape from the cell, the valve portion 44 of the lid member is provided with several openings 50 therethrough so as to deliver the gas through a devious path into the chamber formed above the valve disc 44 and between the adapter shoulder 19 and the lid 30. The meeting surfaces of the adapter and the lid are fabricated so as not to accurately interfit, but are preferably left in the molded form thereof whereby the slight irregularities of the molded surfaces permit the battery gas to escape therebetween. However, in case the gas within the battery develops so as to build up any appreciable pressure within the cell, such pressure will simply cause the lid 30 to lift slightly relative to its seat against the top surface of the adapter, thereby permitting the gas to escape.

As in the case of my prior application aforesaid, it is a particular feature of the present invention that the lid member 30 and the hinge mechanism thereof is constructed and arranged so as to provide that whenever the lid is lifted and swung over to its open position as illustrated by the broken lines in Fig. 3, the forces of gravity acting thereon will tend to maintain the lid in such open position. However, when in this position the center of gravity of the lid structure is only slightly offset from the vertical plane of the hinge axis, so that in event the battery attendant overlooks closing the lid subsequent to a servicing operation on the battery, the slightest joggling of the battery such as would occur upon movement of the vehicle in which the battery is mounted will cause the lid to fall back into its closed position.

As explained hereinabove the valve 44 wipes smoothly into the bore of the adapter and thereupon operates to prevent splashing of the battery liquid out of the opening, while the gas escape passageways are kept open at all times to permit the battery gas to escape as required. Thus, if the operator is careless and leaves the lid in open condition at the end of a servicing operation, the lid will automatically take care of itself and close for example immediately upon starting of the vehicle carrying the battery. As shown in the drawing, the adapter and lid parts may be formed of hard rubber or plastic material or of any other preferred material or materials except that the lid should have sufficient weight to operate by gravity as set forth hereinabove.

It will be understood that it is another particular feature and advantage of the invention that the hinged lid device is readily adapted to be installed in presently conventional battery constructions while requiring no reconstruction of the battery cell covers; the adapter skirt portion 18 being simply screwed into the conventional battery filler opening. It will be understood that whereas only one form of the invention has been shown and described in detail, it is apparent to those skilled in the art that the invention is not so limited but that various changes may be made therein without departing from the spirit of the invention or the scope of the appended claims.

I claim:

1. A storage battery filler opening cap device for a storage battery including a casing having a threaded aperture therethrough, said cap device comprising a vertically serrated adapter of semi-hard material adapted to be inserted and turned in screw-threading relation into said casing aperture, said adapter having a hinge bearing device integral therewith, and a lid member having a hinge device in connection with said bearing device, said lid member comprising a top cover piece adapted to cover the upper end of said adapter and a reduced diameter central boss portion extending inwardly from said cover piece, and a conical pliable valve disc mounted upon said boss member to extend peripherally therefrom into slide bearing relation against the inner bore of said adaption, said disc being formed with openings therethrough to conduct gas from the interior of said battery cell.

2. A storage battery filler opening cap device for a storage battery, said cap device comprising an annular mounting device, the external surface of which is serrated in the direction of the annular axis and adapted to be pressed and rotated for deformation of the serrations into threaded connection with a screw-threaded opening in a storage battery cell cover, and a cap having a hinge connection with said mounting device.

3. A storage battery filler opening cap device for a storage battery including a casing having an aperture therethrough, said cap device comprising an adapter formed to be inserted in fixed relation within said casing aperture, and a lid member having a hinge device in connection with said adapter, said lid member comprising a top cover piece adapted to cover the upper end of said adapter, said cover piece being formed with an annular recess in the under surface thereof, a weight member fitted into said recess, a reduced diameter central boss portion extending through said weight member, and a valve disc mounted upon said boss member to extend peripherally therefrom into slide bearing relation against the inner bore of said adapter, said disc being formed with an opening therethrough to conduct gas from the interior of said battery cell.

4. A storage battery filler opening cap device for a storage battery including a casing having a threaded aperture therethrough, said cap device comprising a vertically serrated adapter of semi-hard material adapted to be turned in screw-threading relation into said casing aperture, said adapter having a hinge bearing device integral therewith, and a lid member having a hinge device in connection with said bearing device, said lid member comprising a top cover piece adapted to cover the upper end of said adapter and a pliable valve disc mounted upon said lid member to extend therefrom into slide bearing relation against the inner bore of said adapter.

5. A storage battery filler opening cap device for a storage battery, said cap device comprising an annular mounting device the external surface of which is serrated in the direction of the annular axis and adapted to be pressed into and rotated for deformation of the serrations in screw-threading connection with a screw-threaded opening in a storage battery cell cover, and a lid having a hinge connection with said mounting device and carrying a valve member to close the bore of said annular mounting device when said lid is in closed position.

6. A storage battery filler opening cap device for a storage battery including a casing having a threaded aperture therethrough, said cap device comprising an annular adapter formed at its outer surface with serrations running longitudinally thereof and adapted to be rotated in screw-threaded relation within said casing aperture, and a lid member having a hinge device in connection with said adapter, said lid member being provided with a weight member fitted therein, and a valve disc mounted upon said lid to extend therefrom into slide-bearing relation against the inner bore of said adapter when the lid is closed, said disc being formed with an opening therethrough to conduct gas from the interior of said battery cell.

7. A storage battery filler opening cap device for a storage battery including a casing having an aperture therethrough, said cap device comprising an annular adapter adapted to be inserted into said casing aperture, said adapter having a hinge bearing device integral therewith, and a lid member having a hinge device in connection with said bearing device, said lid member comprising a top cover piece and a reduced diameter central boss portion extending inwardly from said cover piece, and a conical pliable valve disc mounted upon said boss member to extend therefrom into slide bearing relation against the inner bore of said adapter, said disc being formed with an annular groove therearound to facilitate flexing thereof during movements thereof within the bore of said adapter.

8. A storage battery filler opening cap device for a storage battery including a casing having aperture therethrough, said cap device comprising an adapter formed to be inserted in fixed relation within said casing aperture, and a lid member having a hinge device in connection with said adapter, said lid member comprising a weighted top cover piece and a valve disc extending therefrom into slide bearing relation against the inner bore of said adapter, said disc being formed with an annular groove adjacent the periphery thereof to facilitate flexing of said disc incidental to movements thereof relative to said adapter.

HENRY A. KENNEDY.

References Cited in the file of this patent

UNITED STATES PATENTS

| Number | Name | Date |
|---|---|---|
| 764,183 | Edison | July 5, 1904 |
| 1,116,893 | Hutchison | Nov. 10, 1914 |
| 1,130,977 | Hutchison | Mar. 9, 1915 |
| 1,165,100 | Holland | Dec. 21, 1915 |
| 2,088,543 | Woodbridge | July 27, 1937 |
| 2,480,437 | Berg et al. | Aug. 30, 1949 |
| 2,506,952 | Doughty | May 9, 1950 |

FOREIGN PATENTS

| Number | Country | Date |
|---|---|---|
| 62,981 | Sweden | Mar. 10, 1924 |
| 203,670 | Great Britain | Apr. 17, 1924 |